United States Patent
Wheat et al.

[11] Patent Number: 6,056,507
[45] Date of Patent: May 2, 2000

[54] ARTICLE WITH BRAZED END PLATE WITHIN AN OPEN BODY END

[75] Inventors: Gary E. Wheat; Robert E. Mc Cracken, both of Madisonville, Ky.; Nicholas C. Palmer, Loveland, Ohio

[73] Assignee: General Electric Company, Cincinnati, Ohio

[21] Appl. No.: 08/880,846

[22] Filed: Jun. 23, 1997

Related U.S. Application Data

[62] Division of application No. 08/689,422, Aug. 9, 1996, Pat. No. 5,672,261.

[51] Int. Cl.⁷ .................................. F01D 5/18; F01D 5/14
[52] U.S. Cl. ......................... 416/92; 416/97 R; 416/224; 416/232; 416/233; 416/241 R; 228/193; 228/206; 228/207; 228/262.31
[58] Field of Search .................. 416/96 R, 96 A, 416/97 R, 92, 224, 232, 233, 241 R, 241 B; 428/680; 415/115, 173.1, 173.4, 173.5; 29/899.72; 228/193, 205, 206, 207, 262.31

[56] References Cited

U.S. PATENT DOCUMENTS

| | | | |
|---|---|---|---|
| Re. 28,849 | 6/1976 | Itai et al. . | |
| 2,779,999 | 2/1957 | Boam et al. | 228/209 |
| 2,957,239 | 10/1960 | Pritchard et al. | 228/206 |
| 3,779,879 | 12/1973 | Scott . | |
| 3,899,267 | 8/1975 | Dennis et al. | 416/92 |
| 4,098,450 | 7/1978 | Keller et al. . | |
| 4,176,433 | 12/1979 | Lee et al. . | |
| 4,214,355 | 7/1980 | Zelahy . | |
| 4,324,594 | 4/1982 | Chasteen . | |
| 4,324,626 | 4/1982 | Mc Givern, Jr. . | |
| 4,390,320 | 6/1983 | Eiswerth . | |
| 4,705,203 | 11/1987 | Mc Comas et al. . | |

*Primary Examiner*—Christopher Verdier
*Attorney, Agent, or Firm*—Andrew C. Hess; Gerry S. Gressel

[57] ABSTRACT

A method for preparing a Ni base superalloy inner wall surface of a body open end, such as an end of a turbomachinery blade, and an end plate, such as a blade tip cap, for brazing together at a rim of the end plate includes electrochemically removing oxides from the inner wall surface. The end plate is prepared, at least at its rim, by first removing surface and subsurface oxides, for example by mechanical abrading or a combination of such abrading and acid cleaning. Then at least the rim is electroplated with Ni which is heated to diffuse the Ni into the rim substrate. This provides an improved combination of surfaces for brazing, for example with a Ni base brazing alloy. After brazing the rim to the inner wall, there is provided an article with an improved relatively low oxide brazed joint, including less than about 20 volume % oxides, and a plate rim of substantially Ni along with elements diffused from the brazing alloy and the rim.

2 Claims, 1 Drawing Sheet

6,056,507

ARTICLE WITH BRAZED END PLATE WITHIN AN OPEN BODY END

This application is a division of application Ser. No. 08/689,422, filed Aug. 9, 1996, now U.S. Pat. No. 5,672,261 (patented Sep. 30, 1997).

FIELD OF THE INVENTION

This invention relates to the brazing of an end plate within a hollow body open end, such as a tip cap or end plate of a hollow, air cooled turbomachinery blade, and, more particularly, to the preparation of the mating parts for brazing, and to the brazed article.

BACKGROUND OF THE INVENTION

In one form of the manufacture of high temperature operating hollow air cooled turbomachinery blades, such as airfoil shaped gas turbine engine turbine blades and vanes, a tip cap or end plate is bonded at the open radially outward end to enclose at least a part of the end for control and discharge of a portion of the cooling fluid from within the blade. Such configurations are widely known in the gas turbine engine art, for example as shown in U.S. Pat. No. 3,899,267—Dennis et al. (patented Aug. 12, 1975); U.S. Pat. No. 4,214,355—Zelahy (patented Jul. 29, 1980); and U.S. Pat. No. 4,390,320—Eisworth (patented Jun. 28, 1983). The disclosures of these patents are hereby incorporated herein by reference.

Typical attachment or bonding of such end plates or tip caps to an open blade body end include welding, diffusion bonding, and brazing. The design of certain modern gas turbine engine turbine blades specify that an end plate or tip plate be secured at an inner wall of the open blade end, recessed within the blade tip plenum instead of at the radially outer edge or top of the open blade end. Many current turbine blades are made of relatively highly alloyed Ni base superalloys including relatively large amounts of the elements Al and Ti. Consequently, as manufactured they include relatively large amounts of surface and near or subsurface oxides of such elements which can interfere with the soundness or integrity of subsequently brazed joints.

To achieve good flow of brazing alloy and an acceptable bond of a blade body end inner wall with an end plate, it has been a practice to remove such detrimental surface and subsurface oxides from the hollow blade body by first vapor blasting then Ni plating the complex shaped hollow body end, without further treatment of the Ni plate. The end plate was prepared by acid cleaning. However, Ni plating of a complex shape such as a hollow air cooled airfoil has been relatively unpredictable and expensive. In addition, vapor blasting at the open blade tip of air cooled blades risks leaving entrapped vapor blasting media within the complex internal cooling passages of the blade, and can lead to decreased blade life during high temperature operation. Also, acid cleaning alone of Ni base superalloy blade tip caps or end plates does not provide an ideal surface for good brazing alloy flow: it is difficult to remove effectively all surface and near surface oxides from tip caps or end plates without exceeding design limits for intergranular attack of the plate substrate. As a consequence, prior brazed joints have been observed to include as much as 80–90 volume % oxides.

SUMMARY OF THE INVENTION

The present invention, in one form, provides, in a method for making an article such as a turbomachinery blade, a method for preparing for brazing together an inner wall of a hollow body open end and a rim of an end plate. The wall is made of a Ni base superalloy which includes at least about 5 wt. % total of Al and/or Ti. The end plate, which generally is made of a similar Ni base alloy, bridges at least A part of the open end and its rim is shaped to match the shape of the surface of the inner wall with which it is intended to be brazed. Preparation of mating members prior to brazing includes electrochemically removing material from the inner wall surface of the hollow body open end, with the inner wall surface as an anode, to remove oxides from the inner surface. The plate rim, and conveniently the entire plate, is prepared by first removing surface and subsurface oxides and organic contaminants, in one form, by a combination of first mechanically abrading and then acid cleaning the rim. Then at least the rim of the end plate is electroplated with Ni, for example to a thickness which will not reduce the Ni base alloy mechanical properties below a selected limit such as a design limit upon subsequent treatment, in one form up to about 0.002". The electroplated Ni is then heated to diffuse the Ni into the substrate. The presence of such a diffused Ni surface has been found to enhance braze bonding between the mating surfaces. After brazing the rim to the inner wall, typically with a Ni base brazing alloy, there is provided an article with a brazed joint between the above described members characterized by a relatively low amount of oxides in the brazed joint, for example less than 20 volume %, and a plate rim at the brazed joint of substantially Ni and elements diffused from the brazing alloy and from the plate rim.

DESCRIPTION OF THE PREFERRED EMBODIMENTS

The higher temperatures designed for components in the hot or turbine sections of current gas turbine engines require use of more highly alloyed superalloys, mostly based on Ni and frequently with microstructures controlled for multi-elongated grains or substantially single crystal configurations. In order to attain the high temperature strengths required for such use, such alloys as the Ni base superalloys include relatively large amounts of one or more of the gamma prime strengtheners Al and Ti, generally at least about 5 wt % total, along with a variety of other elements, as widely described in the literature. Typical Ni based superalloys which are used in current gas turbine engine turbine components include Rene' 80 alloy, more fully described in U.S. Pat. No. 3,615,376—Ross (patented Oct. 26, 1971) and including nominally by weight about: 9.5% Co, 3% Al, 14% Cr, 5% Ti, 4% W, 4% Mo, 0.17% C, 0.015% B, 0.03% Zr, with the balance Ni and incidental impurities. In a directionally oriented grain form, such alloy can include about 0.75% Hf. Another Ni base superalloy used to make such components sometimes is called Rene' 125 alloy, including nominally by weight about: 10% Co, 4.8% Al, 9% Cr, 2.5% Ti, 3.8% Ta, 7% W, 2% Mo, 1.5% Hf, 0.11% C, 0.01% B, 0.05% Zr, with the balance Ni and incidental impurities. Still another Ni base superalloy, generally made substantially in single crystal form and referred to as Rene' N4 alloy, includes nominally by weight about: 7.5% Co, 9%

Cr, 3.5% Al, 4.8% Ti, 1.5% Mo, 4% Ta, 6% W, 0.004% C, 0.5% Cb, with the balance Ni and incidental impurities. All of such alloys include relatively large amounts of the gamma prime strengtheners Al and Ti.

Although of significant help and necessary in strengthening such alloys, Al and Ti can form, during manufacture, tenacious surface oxides which can interfere with the flow of brazing alloys at a surface. Therefore, brazing between surfaces of Ni base superalloy components has been preceded by attempts first to remove such surface oxides.

Figure 1:
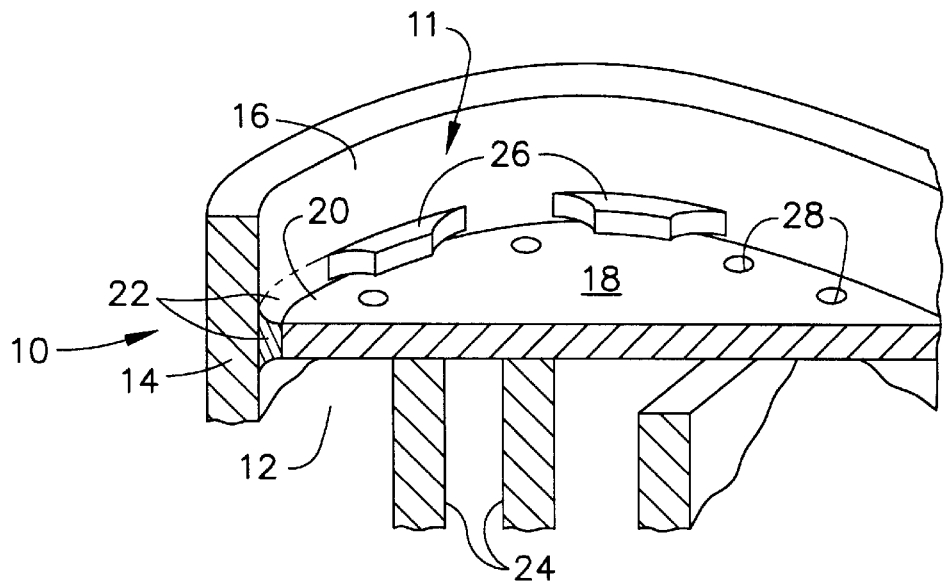
FIG. 1 is a fragmentary partially sectional diagrammatic view of an open end of a turbine blade with an end plate rim brazed at a body inner wall recessed within the open end.
Figure 2:
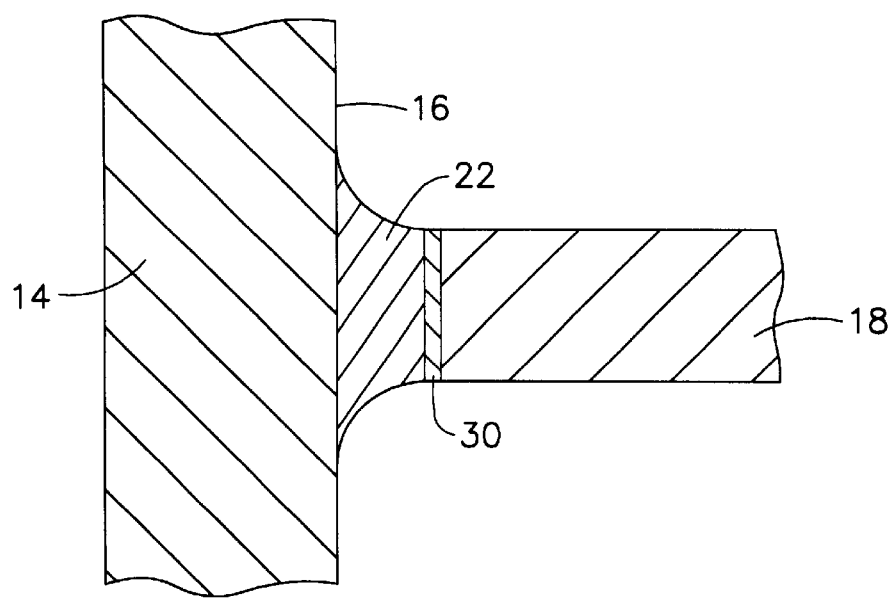
FIG. 2 is an enlarged fragmentary sectional view of a portion of FIG. 1 about the brazed joint.

The present invention will be more clearly understood through reference to the figures of the drawing. FIG. 1 is a fragmentary partially sectional diagrammatic view of a portion of the radially outward end or tip of an article in the form of an air cooled gas turbine blade or body, shown generally at 10, and including an open end shown generally at 11. The body of the blade has a hollow interior 12 enclosed by outer wall 14 having an inner wall surface 16 which defines at least a portion of the open end. An end plate 18, sometimes called a tip cap, includes a plate rim 20. The plate rim is shaped to match with at least a portion of the inner wall surface 16. The end plate is disposed within the open lade end or tip plenum and brazed at brazed joint 22 to inner wall surface 16. In the form shown in FIG. 1, end plate 18 is positioned by resting on internal walls 24, which define a portion of the complex labyrinthine internal structure of the hollow blade. Assisting in the positioning of the end plate within the blade tip plenum are positioning members 26 projecting from inner wall surface 16, in the form shown in the drawing. Frequently, such an end plate includes cooling air discharge openings 28, for example as shown in more detail in the above incorporated U.S. Pat. No. 3,899, 267—Dennis et al. FIG. 2 is an enlarged sectional fragmentary diagrammatic view of a portion of FIG. 1 about brazed joint 22. Shown in FIG. 2 is the Ni rich surface portion 30 of rim 20 of end plate 18 after brazing.

As was described above in connection with brazing of tip caps or end plates to the open ends of hollow air cooled turbomachinery blades, when the components were made of Ni based superalloys it has been a practice to first vapor blast to remove surface oxides and then Ni electroplate the open end of the hollow blade, sometimes called the blade plenum. Preparation of the end plate involved acid cleaning to remove surface oxides. However, vapor blasting an open end of a hollow blade which generally includes a labyrinthine inner structure risks leaving therein vapor blast media which has been shown to reduce operating life of the blade, for example by blocking designed cooling air flow. In addition, Ni electroplating of such an open end body of complex shape is both relatively unpredictable and expensive. In addition, it is difficult to remove effectively all surface oxides from the end plate, which generally is relatively thin (such as about 0.03" thick), without exceeding design limitations for intergranular attack of the substrate.

The present invention obviates such problems by safely removing material from the inner wall of the open blade end or plenum by electrochemical material removal, with the inner wall surface connected as an anode. This type of process has been widely described in the literature and used for many years to remove or "deplate" material in an electrolyte bath. Sometimes called electrochemical machining, this process involves the location of an appropriately shaped tool, connected as a cathode, closely opposite a workpiece connected as an anode. An electrolyte is passed between the tool and the workpiece while an electric current is impressed across such electrodes. The result is that a material removal or "deplating" action occurs at the workpiece anode. Such a process has been applied in a large number of patents including U.S. Pat. Nos. 3,271,291—Crawford et al.(patented Sep. 6, 1966); 3,409,524—Olson (patented Nov. 5, 1968); 3,433,730—Kennedy (patented Mar. 18, 1969); 3,779,879—Scott (patented Dec. 18, 1973); and 4,324,626—McGivern, Jr. (patented Apr. 13, 1982). The disclosures of these patents hereby are incorporated herein by reference. Use of such electrochemical process for material removal, particularly removal of undesirable oxides, from the inner wall surface of the blade open end avoids entrapment of foreign particles within the complex interior of the hollow blade, which can result from known methods. In addition, the electrolyte used can be flushed easily from the blade interior.

Another feature of the present invention is preparation of the end plate for brazing within the open blade end or plenum at the electrochemically treated inner surface of a blade wall. Such preparation, in one form, includes removal of surface and subsurface oxides and organic material, at least from the plate rim and conveniently from the entire end plate, while avoiding detrimental intergranular attack of the plate substrate. This is accomplished, in a preferred form of the present invention, by a combination of first mechanically abrading the rim or entire plate, for example by tumbling with an abrasive medium or slurry, or by vapor blasting, or by a combination of such operations, as will be described below. Then the abraded surface is acid cleaned. After this combination of surface and subsurface cleaning, the plate rim, or conveniently the entire plate, is electroplated with Ni to a depth which will not affect detrimentally the mechanical properties of the substrate alloy upon subsequent treatment. Such Ni electroplating, which conveniently can be accomplished concurrently on a relatively large number of the relatively simple shaped end plates such as in barrel plating, provides a good surface for subsequent brazing and acts as a barrier between any remaining subsurface oxides which are detrimental to brazing alloy flow. However it has been recognized that application of electroless Ni results in an undesirable chemical attack on the surface. Thereafter, the electroplated Ni is heated, for example by heat treating in a vacuum, to diffuse the Ni into the substrate on which it has been deposited. Preferably, such heat treatment is conducted at a temperature of at least the planned brazing temperature and less than a temperature which will not reduce mechanical properties of the Ni base superalloy substrate below a selected limit.

During evaluation of the present invention, a gas turbine engine air cooled high pressure turbine blade made of the above described Rene' N4 Ni base superalloy was manufactured with a brazed end plate made of the above described Rene' 125 Ni base superalloy. During manufacture, the open blade tip plenum without the end plate was electrochemically treated, as generally described above, to remove surface and subsurface material, including oxides, by submerging the blade tip in an aqueous solution of a mixture by volume of about 6–10% hydrofluoric acid (70%) and about 40–50% sulfuric acid (66° Baume'). The blade was connected as an anode and a lead member, disposed within the blade open plenum, was connected as the cathode. While submerged in the aqueous solution, an electric current of about 3 amps was applied between the electrodes for about 75–90 seconds. The time was selected to avoid excess, undesirable intergranular attack on and pitting of the plenum inner wall, but adequate to remove the material desired. This relatively aggressive electrochemical "deplating" of the plenum inner wall effectively removed surface and entrapped oxides and provided a clean, substantially oxide free blade tip inner surface for brazing.

An end plate shaped to match with at least a portion of the open blade end inner wall, was prepared for brazing with the inner wall by a series of steps according to the present invention. Although the plate rim is the portion which subsequently is brazed with the inner wall, it generally is more convenient to prepare the entire relatively small and simple shaped end plate, particularly in those examples in which air cooling discharge holes later are to be generated in the end plate by laser drilling. In some configurations, end plates are shaped to register with only a portion of, rather than the entire, inner wall at the blade tip or plenum. First, surface and subsurface oxides and organic contaminants are removed. Then the rim or end plate is electroplated with Ni which is heated to diffuse the Ni into the rim or entire end plate.

In this specific example, such oxides and contaminants were removed by a combination of first mechanical abrading and then acid cleaning the end plates. In a specifically preferred form, mechanical abrasion was interspersed with acid cleaning: The end plates or tip caps, in a batch of 300 or more, first were mechanically cleaned by a method commercially available as Harperizing cleaning, involving tumbling in a barrel with an aqueous abrasive media. The tumbling material used was 3/16×3/8 AC 25 30 media with a Harperizer Barrel Finishing Material MFC-3. This operation removed the bulk of the oxides on the plate surface to expose subsurface oxides. After tumbling for about two hours, the end plates were rinsed with water to remove the media. A first acid cleaning step was conducted by submerging the plates for about 80–90 seconds in a phosphoric acid base material commercially available as Metex M-618 solution and then rinsed with water. Thereafter, to removed products from the phosphoric acid reaction and to reactivate the surface, the plates were vapor blasted in a container using a fine, soft type, silicon dioxide abrasive commercially available as Novaculite 625 material. Then the end plates were rinsed with water. To assure no organic surface material remained, such as from handling, in this example the plate surface thus prepared was again acid cleaned with hot nitric acid in a stainless steel vessel using about 85–100% nitric acid (42° Baume') at about 180–200° F. for about 5 minutes. After rinsing with water, the end plates were submerged in the above described aqueous mixture of hydrofluoric and sulfuric acids at room temperature for about 35 seconds and then rinsed with water. This specific example is representative of preparation of the end plate by removing surface and subsurface oxides and organic contaminants prior to electroplating Ni on such cleaned surface, according to the present invention.

The electrodeposition of Ni, in this example, was accomplished by barrel plating using a commercial nickel sulfamate solution (concentration 10 to 12 ounces per gallon of nickel), in a manner commercially used and well known in the plating art. In order to limit the Ni electroplate to a maximum of about 0.002" in this example to avoid dilution of the Ni alloy substrate and reduction of its mechanical properties below a selected limit such as a design limit for the article, the end plates were barrel plated for about 15 minutes at 12 amps. In this example, the Ni plate was limited to a maximum thickness of about 0.0012".

After rinsing in water and drying, the end plates were heated in vacuum at a temperature in the range of about 2155–2225° F. for about 15 minutes to diffuse the Ni electroplate into the plate surface, including the rim. This resulted in a substantially Ni surface improved for brazing and braze bonding, more Ni-rich than the substrate, with some elements diffused from the plate substrate.

In this example, air cooling holes of about 0.01–0.02" were laser drilled and deburred in the end plates, as is well known and practiced commercially in the art. The presence of the diffused Ni in the plate surface enables such laser drilling and deburring to be conducted without adversely affecting the plate surface. Because such handling can result in organic materials on the plate surface, the above hot nitric acid treatment was repeated for about five minutes. After rinsing with water and drying, the end plates were positioned in the open end of the blade prior to brazing.

A brazing alloy powder was disposed at the juncture of the rim 20 and inner wall 16, as shown in FIG. 1. The brazing alloy used in this example was a Ni base brazing alloy, generally described in U.S. Pat. No. 3,700,427—Hoppin III, et al., and consisting nominally, by weight, about: 10% Co, 3% Al, 14% Cr, 5% Ti, 4% W, 4% Mo, 4.5% Si, 0.16% C, 0.7% B, 0.03% Zr, with the balance Ni and incidental impurities. The brazing temperature for this alloy was within about 2100–2250° F., generally within the range of about 1900–2300° F. used for Ni base brazing alloys. Therefore, the above described heat treatment to diffuse the Ni electroplate was conducted in that range. With the end plate positioned as described, a brazing operation was conducted in a vacuum in that brazing temperature range to braze the plate rim to the inner wall of the open blade end. Resulting from practice of the above described preparation and brazing method was the article including between the plate rim and the inner wall surface an improved brazed joint including less than 20 volume % oxides in the joint and a plate rim at the brazed joint characterized by a substantially Ni surface along with elements diffused from the brazing alloy and from the rim substrate.

The present invention has been described in connection with some specific examples, embodiments, and combinations, primarily relating to the original manufacture of an article. However, it should be understood that this invention is capable of a variety of applications, including repair procedures, as well as modifications, variations and amplifications without departing from its scope as defined in the appended claims.

What is claimed is:

1. An article including a body having a hollow interior and an open end comprising a wall of a Ni base superalloy which includes at least about 5 weight % total of at least one element selected from the group consisting of Al and Ti, the wall having an inner wall surface which defines at least a portion of the open end, and an end plate bridging at least a portion of the open end, the end plate including a plate rim shaped to match with at least a portion of the inner wall surface and brazed with the inner wall surface with a Ni base brazing alloy at a brazed joint between the plate rim and the inner wall surface, the improvement wherein:

the brazed joint includes less than about 20 volume % oxides; and, the plate rim at the brazed joint is substantially Ni along with elements diffused from the brazing alloy and the end plate.

2. The article of claim 1 in the form of an air cooled turbomachinery blade in which:

the wall of the open end and the inner wall surface are airfoil shaped; and, the end plate is made of a Ni base superalloy.

* * * * *